Oct. 31, 1944.  W. ZEINDLER  2,361,674
HAND TRUCK
Filed Dec. 14, 1942  3 Sheets-Sheet 1

INVENTOR.
Werner Zeindler
BY Earl D. Chappell
ATTORNEYS.

Oct. 31, 1944.  W. ZEINDLER  2,361,674
HAND TRUCK
Filed Dec. 14, 1942  3 Sheets-Sheet 2
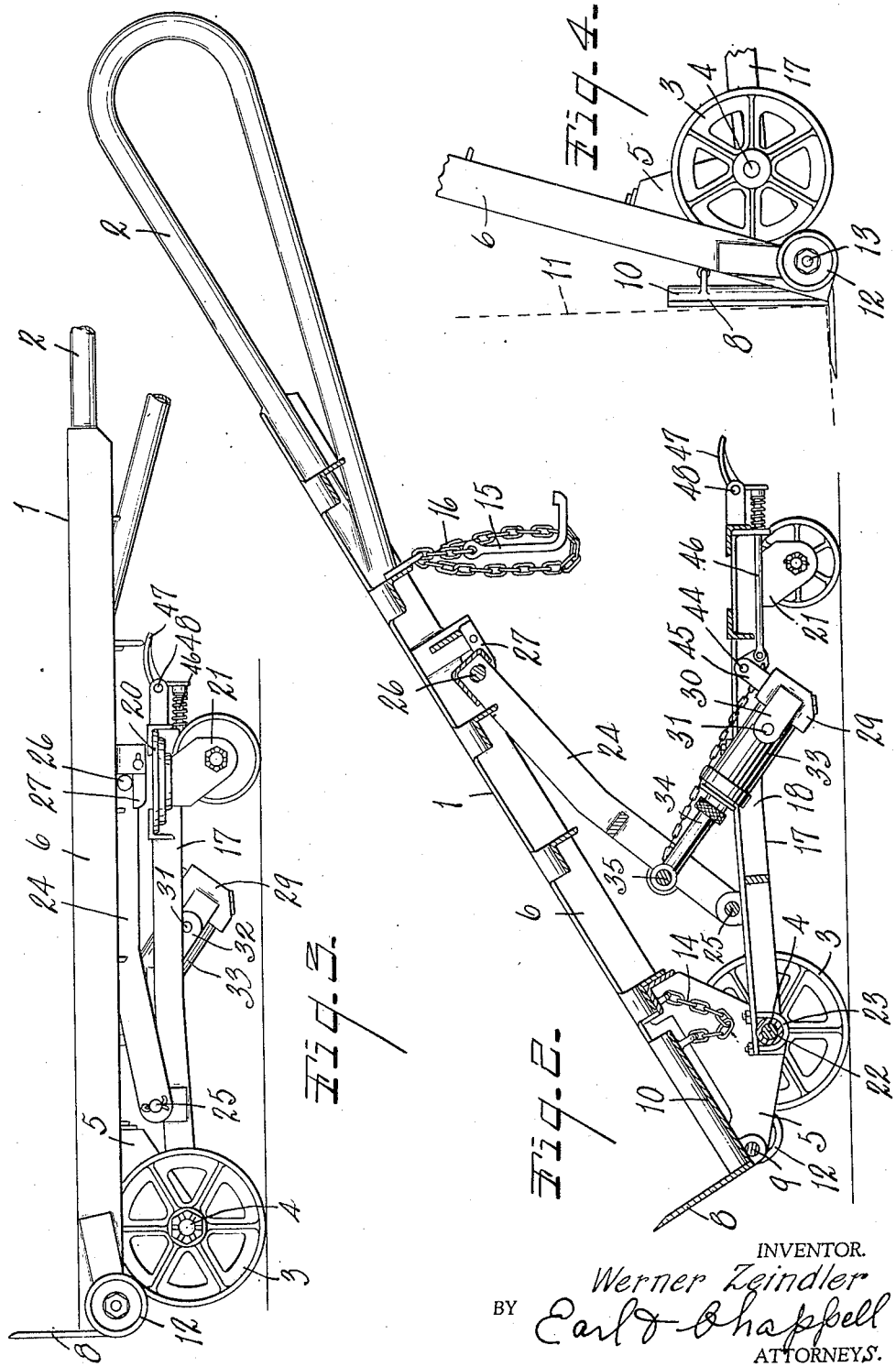
INVENTOR.
Werner Zeindler
BY Earl & Chappell
ATTORNEYS.

Oct. 31, 1944.　　W. ZEINDLER　　2,361,674
HAND TRUCK
Filed Dec. 14, 1942　　3 Sheets-Sheet 3
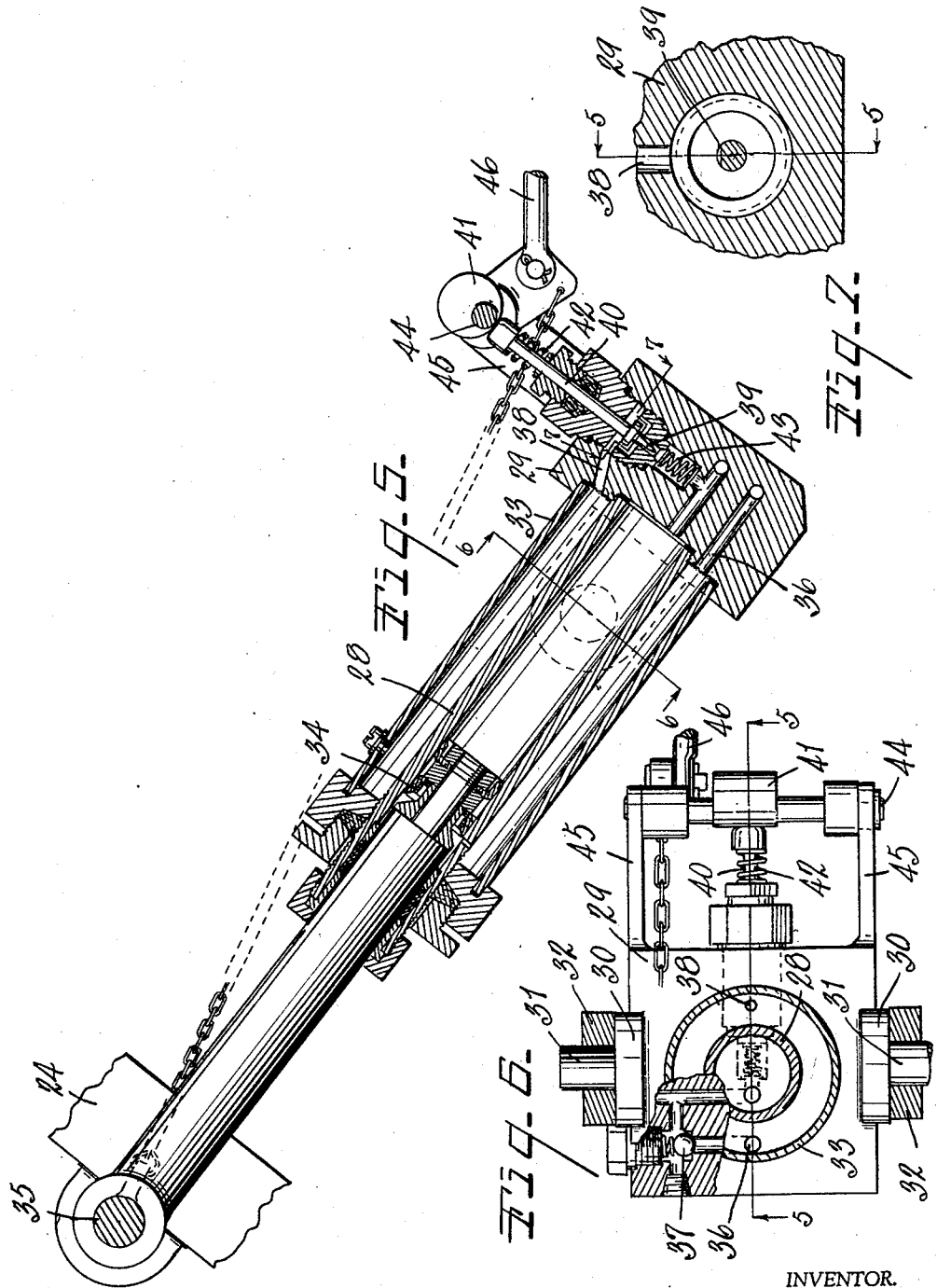
INVENTOR.
Werner Zeindler
BY Earl T. Chappell
ATTORNEYS.

Patented Oct. 31, 1944

2,361,674

UNITED STATES PATENT OFFICE 2,361,674

HAND TRUCK

Werner Zeindler, Albion, Mich., assignor, by mesne assignments, to Domestic Industries, Inc., a corporation of Delaware Application December 14, 1942, Serial No. 468,933

10 Claims. (Cl. 214—65.4)

This invention relates to improvements in hand trucks.

The main objects of this invention are:

First, to provide an improved hand truck well adapted for use in handling heavy objects, such as relatively heavy rolls of paper, with comparatively little effort on the part of the operator.

Second, to provide a hand truck of this character which enables the transportation of objects thereon considerable distances with comparatively little effort and the easy unloading of the truck with a minimum of effort and danger to the operator.

Third, to provide a hand truck having these advantages which may be easily and quickly loaded.

Objects relating to details and economies of the invention will appear from the description to follow. The invention is defined and pointed out in the claims.

A preferred embodiment of the invention is illustrated in the accompanying drawings, in which:

Fig. 2 is a vertical longitudinal section with the main frame in supported relation to the standard.

Fig. 3 is a fragmentary side elevation with the main frame in lowered position resting upon the wheeled auxiliary frame.

Fig. 4 is a fragmentary side elevation illustrating the main frame in its forwardly tilted position and the nose piece in load engaging or receiving position.

Fig. 5 is an enlarged fragmentary view partially in section on line 5—5 of Figs. 6 and 7 illustrating details of the hydraulic standard control means.

Fig. 6 is a fragmentary view partially in section on line 6—6 of Fig. 5.

Fig. 7 is an enlarged view in section on line 7—7 of Fig. 5.

Figure 1:
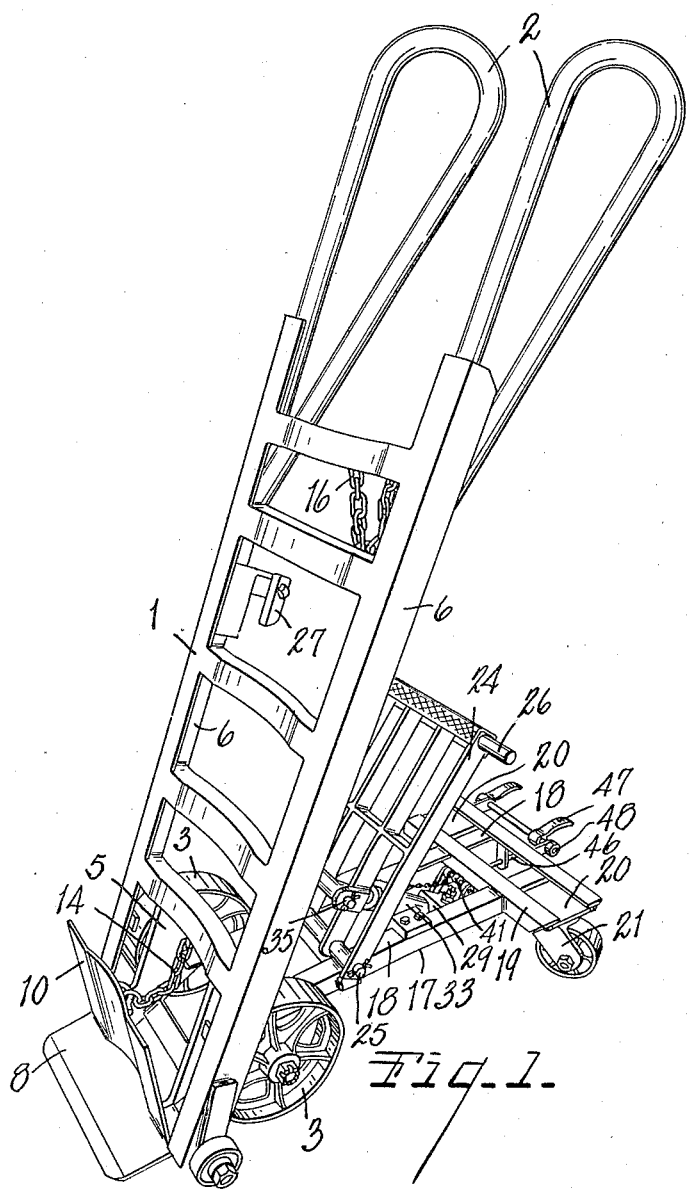
Fig. 1 is a perspective view of a hand truck embodying the features of the invention with the main frame supporting standard in elevated position and the main frame tilted forwardly out of supporting relation to the standard, the nose piece also being in partially tilted position.

Referring to the drawings, the main frame or bed 1 of the truck is provided with handles 2 at its rear end and carrying wheels 3 at its forward end. The axle 4 of these carrying wheels 3 is mounted on axle hangers or brackets 5 depending from the main frame.

The main frame is made up of side rails 6 and suitable crosspieces 7. The joints for these parts are not illustrated as they are preferably welded together. However, it will be noted that the crosspieces are downwardly curved in the embodiment illustrated, the structure being especially designed for holding rolls of paper. The seating, resulting from the downward curvature of the crosspieces, receive the roll of paper and retain it, avoiding the necessity for chucking or blocking the load.

The side rails and crosspieces may be suitably formed of angle iron while the handles 2 are, in the structure illustrated, formed of pieces of piping or tubing and the parts are, as stated, preferably united by welding and I have therefore not attempted to show joints.

The main frame or bed is tiltable or swingable relative to the axle. The nose piece 8 is pivotally mounted at 9 for forward tilting movement and is provided with a back plate 10 so that the load, such as a roll of paper, as indicated at 11 in Fig. 4, may be engaged by inserting the nose piece thereunder and tilting the roll of paper backwardly against the back piece until the load comes to rest on the main frame. Relatively heavy objects may be tilted.

Rollers 12 are provided, these being carried by the journals 13, see Fig. 4, so that the rollers are positioned at the ends of the main frame and support the same when it is in its forwardly tilted load receiving position and enable a more easy engagement of the load.

The forward tilting movement of the nose piece 8 is limited by the chain 14, one end of which is secured to the nose back piece 10 and the other to the main frame. The load engaging hook 15 on the chain 16 is adapted to be engaged with the load, the hook illustrated being especially designed to be engaged with the core of a roll of paper.

I provide an auxiliary or sub-frame designated generally by the numeral 17 and comprising suitable side members 18 and connecting crosspieces, the rear connecting crosspiece 19 being extended beyond the side pieces to receive the caster plates 20 of the caster wheels 21. The forward end of the side members of the auxiliary frame 17 are connected to the axle 4, the axle being provided with a sleeve 22 to which the frame is clamped by the U-bolts 23, see Fig. 2.

The standard 24 is pivotally mounted on this sub or auxiliary frame 17 at 25 to be swung in a rearwardly inclined position. The upper end of the standard is provided with laterally projecting main frame engaging members 26 which are adapted to engage beneath the side rails.

The main frame is preferably provided with keepers 27 which receive the members 26 when the parts are in position, as shown in Fig. 2, these keepers serving purposes which will become apparent as the description proceeds.

On the auxiliary frame 17 I mount a cylinder 28, this cylinder comprising a head portion 29 provided with arms 30 having journals 31 engaging suitable hangers 32 provided therefor on the main frame. The cylinder is surrounded by a sump 33 also cylindrical and mounted in the head 29. A plunger 34 is provided with suitable packing and is pivotally connected at 35 to the standard 24.

The cylinder is connected to the sump by the passage 36 provided with a return check valve 37. The cylinder is also connected to the sump by the relief or exhaust passage 38 controlled by the valve 39. This valve is actuated by the push rod 40 operatively associated with the eccentric 41, the push rod being urged against the eccentric by means of the coiled spring 42 while the valve 39 is urged to its seat by the spring 43.

The eccentric is mounted at 44 on an upwardly projecting arm 45 on the head member 29 and is actuated from the link 46 slidable in the auxiliary frame and positioned to be actuated by the foot lever 47 pivoted at 48. There are preferably a pair of these foot levers so that they may be readily accessible from either side of the truck.

In the embodiment illustrated, when the main frame is lowered upon the auxiliary frame as shown in Fig. 3, the members 26 are engaged with the keeper 27 so that when the main frame is swung forwardly or tilted forwardly on the axle, the standard is lifted and the plunger pulled out, allowing the hydraulic fluid to flow into the cylinder. The check valve 37, however, prevents its return to the sump and the standard is supported in its elevated position. However, as the main frame swings forwardly beyond the fully elevated position of the standard, the keeper is disengaged or released and the main frame may be swung forwardly independently of the standard. This permits the manipulation of the main frame to engage the load and the load can be easily swung to standard engaging position without undue effort on the part of the operator. After the loaded main frame has engaged the standard, the lowering of the main frame upon the auxiliary or sub-frame is controlled by controlling the exhaust valve 39. Its speed of lowering may be regulated to some degree but the capacity of the exhaust passage is such that it is impossible to lower the load with dangerous speed or allow it in effect to drop.

With the loaded main frame resting upon the auxiliary frame, the truck may be manipulated for transporting the load or the load may be transported with the main frame in the position shown in Fig. 2—that is, supported by the standard and all the operator has to do is to push the truck about. If it is manipulated in this position to the point of unloading, the main frame is then lowered upon the auxiliary frame and the load rolled off, or if it is a roll of paper or other load, is slid off or otherwise removed from the truck.

I have illustrated and described my improvements in a highly satisfactory commercial embodiment thereof. I have not attempted to illustrate or describe certain embodiments or adaptations as it is believed that this disclosure will enable those skilled in the art to embody or adapt my improvements as may be desired.

Having thus described my invention, what I claim as new and desire to secure by Letters Patent is:

1. In a truck, the combination of a main frame provided with handles at its rear end and carrying wheels and axle therefor at its forward end, said main frame being tiltable relative to its said axle, an auxiliary frame mounted at its forward end on said axle and provided with caster wheels at its rear end adapted to support said main frame when it is in its fully lowered position, said handles projecting rearwardly of said auxiliary frame for manipulation of the truck by a person positioned behind said auxiliary frame, a supporting standard pivotally mounted on said auxiliary frame for swinging movement in a rearwardly inclined position and provided with main frame engaging members at its outer end, said main frame being provided with forwardly facing keepers with which said standard engages when the standard is in elevated position and the main frame is lowered to a predetermined position and permitting disengagement of the main frame from the standard when the main frame reaches a predetermined position in its forward tilting movement, a hydraulic cylinder pivotally mounted on said auxiliary frame and provided with a sump, a coacting plunger pivotally mounted on said standard, there being a check valve connection for the inner end of the cylinder to the sump, a restricted valved exhaust connection for said cylinder to said sump, and manually operated means for releasing said exhaust valve.

2. In a truck, the combination of a main frame provided with handles at its rear end and carrying wheels and axle therefor at its forward end, said main frame being tiltable relative to its said axle, an auxiliary frame mounted at its forward end on said axle and provided with caster wheels at its rear end adapted to support said main frame when it is in its fully lowered position, said handles projecting rearwardly of said auxiliary frame for manipulation of the truck by a person positioned behind said auxiliary frame, a supporting standard pivotally mounted on said auxiliary frame for swinging movement in a rearwardly inclined position and provided with main frame engaging members at its outer end, a hydraulic cylinder pivotally mounted on said auxiliary frame and provided with a sump, a coacting plunger pivotally mounted on said standard, there being a check valve connection for the inner end of the cylinder to the sump, a restricted valved exhaust connection for said cylinder to said sump, and manually operated means for releasing said exhaust valve.

3. In a truck, the combination of a main frame provided with handles at its rear end and carrying wheels and axle therefor at its forward end, said main frame being tiltable relative to its said axle, an auxiliary frame mounted at its forward end on said axle and provided with caster wheels at its rear end adapted to support said main frame when it is in its fully lowered position, said handles projecting rearwardly of said auxiliary frame for manipulation of the truck by a person positioned behind said auxiliary frame, a supporting standard pivotally mounted on said auxiliary frame for swinging movement in a rearwardly inclined position and provided with main frame engaging members at its outer end, said main frame being provided with forwardly facing keepers with which said standard engages when the standard is in elevated position and the main frame is lowered to a predetermined position and permitting disengagement of the main frame from the standard when the main frame reaches a predetermined position in its forward tilting movement, and control means for said standard.

4. In a truck, the combination of a main frame provided with handles at its rear end and carrying wheels and axle therefor at its forward end, an auxiliary frame mounted at its forward end on said axle and provided with caster wheels at its rear end adapted to support said main frame when it is in its fully lowered position, said main frame being tiltable relative to said auxiliary frame, said handles projecting rearwardly of said auxiliary frame for manipulation of the truck by a person positioned behind said auxiliary frame, a supporting standard pivotally mounted on said auxiliary frame for swinging movement in a rearwardly inclined position and provided with main frame engaging members at its outer end, and valve controlled hydraulic means connecting said supporting standard to said auxiliary frame for controlling the pivotal movement of said supporting standard.

5. In a truck, the combination of a main frame provided with handles at its rear end and carrying wheels and axle therefor at its forward end, said main frame being tiltable relative to said axle, a load engaging nose piece pivotally mounted on the forward end of said main frame and having a back plate disposed at an angle thereto and tiltable therewith, said main frame being provided with rollers at its front end disposed to facilitate the engagement of the nose piece with the load when the main frame is in its forward load receiving position, means limiting the downward tilting movement of said nose piece relative to the main frame, an auxiliary wheeled frame with which said main frame is swingably associated adapted to support said main frame when it is in its lowered position, an adjustable supporting standard for said main frame mounted on said auxiliary frame, and means carried by said auxiliary frame and operatively associated with said standard for controlling a further lowering movement thereof.

6. In a truck, the combination of a main frame provided with handles at its rear end and carrying wheels and axle therefor at its forward end, said main frame being tiltable relative to said axle, a load engaging nose piece pivotally mounted on the forward end of said main frame and having a back plate disposed at an angle thereto and tiltable therewith, means limiting the downward tilting movement of said nose piece relative to the main frame, an auxiliary wheeled frame with which said main frame is swingably associated adapted to support said main frame when it is in its lowered position, said handles projecting rearwardly of said auxiliary frame for manipulation of the truck by a person positioned behind said auxiliary frame, an adjustable supporting standard for said main frame mounted on said auxiliary frame, and means carried by said auxiliary frame and operatively associated with said standard for controlling a further lowering movement thereof.

7. In a truck, the combination of a main frame provided with handles at its rear end and carrying wheels and axle therefor at its forward end, an auxiliary wheeled frame with which said main frame is swingably associated adapted to support said main frame when it is in its lowered position, said main frame being tiltable relative to said auxiliary frame, said handles projecting rearwardly of said auxiliary frame for manipulation of the truck by a person positioned behind said auxiliary frame, an adjustable supporting standard for said main frame mounted on said auxiliary frame, and valve controlled hydraulic means carried by said auxiliary frame and operatively associated with said standard for controlling a further lowering movement thereof.

8. In a truck, the combination of a main frame provided with handles at its rear end and carrying wheels and axle therefor at its forward end, said main frame being tiltable relative to said axle, a load engaging nose piece pivotally mounted on the forward end of said main frame and having a back plate disposed at an angle thereto and tiltable therewith, said main frame being provided with rollers at its front end disposed to facilitate the engagement of the nose piece with the load when the main frame is in its forward load receiving position, said handles projecting rearwardly of said auxiliary frame for manipulation of the truck by a person positioned behind said auxiliary frame, and means limiting the downward tilting movement of said nose piece relative to the main frame.

9. In a truck, the combination of a main frame provided with handles at its rear end and carrying wheels and axle therefor at its forward end, said main frame being tiltable relative to the axis of said axle, a load engaging nose piece pivotally mounted on the forward end of said main frame and having a back plate disposed at an angle thereto and tiltable therewith, the load being automatically transferred from said back piece to said frame when the nose piece is in its rearward position, and means limiting the downward tilting movement of said nose piece relative to the main frame.

10. In a truck, the combination of a main frame provided with handles at its rear end and carrying wheels and axle therefor at its forward end, said main frame being tiltable relative to said axle, an auxiliary wheeled frame with which said main frame is swingably associated adapted to support said main frame when it is in its lowered position, an adjustable standard for said main frame pivotally mounted on said auxiliary frame, said main frame being provided with keepers with which said standard engages when the standard is in elevated position and the main frame is lowered to supporting engagement therewith and permitting disengagement of the main frame from the standard when the main frame is thrown forwardly from such standard engaging position, and a hydraulic means carried by said auxiliary frame and operatively associated with said standard for controlling a further lowering movement thereof.

WERNER ZEINDLER.